July 7, 1925.
F. S. MORTON
THRUST BEARING
Filed Sept. 2, 1924
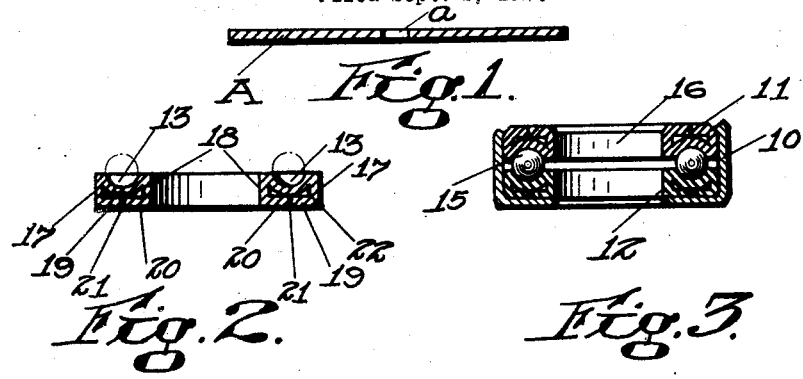
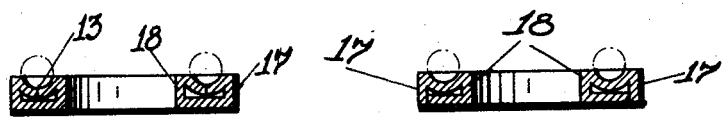
Fig.4.
Fig.5.
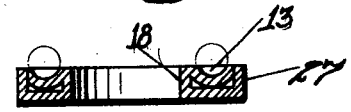
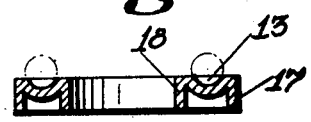
Fig.6.
Fig.7.
Fig.8.
Fig.9.
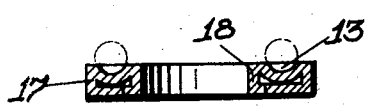
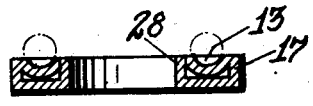
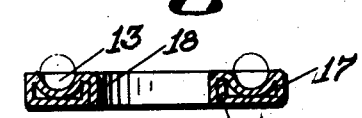
Fig.10.
Fig.11.
Inventor:
Fred S. Morton
By Southgate & Southgate
Attorneys.

Patented July 7, 1925.

1,544,676

UNITED STATES PATENT OFFICE.

FRED S. MORTON, OF WORCESTER, MASSACHUSETTS.

THRUST BEARING.

Application filed September 2, 1924. Serial No. 735,250.

*To all whom it may concern:*

Be it known that I, FRED S. MORTON, a citizen of the United States, residing at Worcester, in the county of Worcester and State of Massachusetts, have invented a new and useful Thrust Bearing, of which the following is a specification.

This invention relates to that class of ball races used in thrust bearings.

The principal object of the invention is to provide for manufacturing the two ball races of sheet metal in such a form that it will leave only small scraps of waste and permit of the use of metal of comparatively thin stock, thus economizing in two ways in the amount of metal used.

Reference is to be had to the accompanying drawings, in which

Fig. 1 is a central sectional view of a circular blank as originally cut out for the production of half of a race in its preferred form;

Fig. 2 is a central sectional view of one of the races formed from that blank;

Fig. 3 is a similar sectional view of the complete roller with the balls and outer casing in place; and Figs. 4, 5, 6, 7, 8, 9, 10, and 11 are views similar to Fig. 2 showing other forms in which the invention can be carried out.

Referring first to Figs. 1, 2, and 3, I would say that a ball race constructed in the general type shown in Fig. 3 is formed of thin sheet metal instead of thick metal or bar stock. As these races have been made before, there is an outer case 10 substantially cylindrical outside and two ball races 11 and 12 inside the outer case, one fixed to it and the other freely rotatable in it without touching it or at least bearing on it. They are provided with circular grooves 13 of semi-circular cross-section for the balls 14. These ball races ordinarily are each made of a solid piece of metal of substantially the total thickness shown in Fig. 3 which involves a large waste of the metal that is punched out to form the circular opening 16 which has to be provided. Furthermore, it is expensive to handle metal of that thickness and powerful dies have to be used to cut it and manipulate it. This invention has for its purpose the substitution of thin sheet metal stock for the thick metal previously used.

The first operation is to cut out from this thin stock a circular blank A as shown in Fig. 1, having a perforation $a$ at the center. As will be seen from the description that follows, this small perforation at the center constitutes all the waste there is inside the blank and reduces the total amount of waste as well as the size of the waste pieces. This blank can be shaped up in dies in various shapes.

In the form shown in Fig. 2 the circular groove 13 as usual is formed at the proper distance from the geometrical center of the blank, that is, the distance which it will occupy in the completed article. Then two flanges 17 and 18 are bent downwardly and backwardly into cylindrical shape from the stock of the blank. Their edges are turned up into the same plane to form the two circular parts 19 and 20 coming into contact with each other on a circle 21. They do not have to be welded but will retain this shape. They engage against the rear surface behind the groove 13 and thus strengthen the article. This leaves a circular space 22 in the ball race but this does not weaken it in view of the construction shown as the two flanges 19 and 20 are in contact with the projecting circular convex wall back of the ball race 13.

This furnishes a ball race adapted to be assembled as shown in Fig. 3, of the same strength as a solid one by the use of thinner metal which can be manipulated more easily and with less power behind the die and with comparatively little waste.

The other figures all show different ways in which a blank originally just like the blank A shown in Fig. 1, or very similar to it, can be formed.

In Fig. 4 the construction is just opposite to that shown in Fig. 2, the ball race being formed on the edges of the last two flanges which are shaped up instead of being formed first.

In Fig. 5 the conditions are the same as in Fig. 2, except that one of the flanges 17 is cut off shorter and the inner flange 18 is made longer and bent up into contact with the side instead of the end of the flange 17.

In Fig. 6 the ball race is formed on the edge of the blank and the entire inner part is bent inwardly and around so as to form an outer cylindrical flange 27 by metal from the interior of the blank.

Fig. 7 is like Fig. 2 except that the flanges 19 and 20 are omitted;

Fig. 8 is like Fig. 5 except the outer flanges instead of the inner flanges are turned in and the point of junction is a little different.

Fig. 9 is a reversal of Fig. 6 practically.

Fig. 10 shows a construction like Fig. 8 except that the joint is formed as in Fig. 5.

Two of these ball races are assembled with the balls and the casing 10 put on them in the usual way to form the complete roller shown in Fig. 3.

These various forms all come within the scope of this invention and are not intended to show all constructions that can be made in accordance with it. In all cases the advantage of thin metal is used, in most cases the amount punched out at the center is very small, and the size of the original blank is as small as practical. In some instances this advantage is partially lost as in Fig. 9, but even in that case the other advantages mentioned are secured.

Although I have illustrated and described only a few forms of the invention I am aware of the fact that many other modifications can be made therein by any person skilled in the art without departing from the scope of the invention as expressed in the claims. Therefore I do not wish to be limited to all the details of construction herein shown and described, but what I do claim is:—

1. As an article of manufacture, a ball race stamped out of a thin sheet of metal from a blank of circular shape and having a circular opening in the center and provided with a circular ball race semi-circular in cross-section and provided with two cylindrical flanges bent from the plane of the original blank at the edges of the semicircular part backwardly to produce the desired thickness of the ball race.

2. As an article of manufacture, a ball race stamped out of a thin sheet of metal from a blank of circular shape and having a circular opening in the center and provided with a circular ball race semi-circular in cross-section formed by bending the metal and provided with two cylindrical flanges bent from the plane of the original blank backwardly to produce the desired thickness of the ball race, and having the edges of said flanges bent inwardly toward each other into a plane and into contact with the rear surface of the blank behind the ball race to strengthen the structure.

3. As an article of manufacture, a ball race for the purpose described formed from a circular blank of sheet metal centrally perforated and provided with a circular groove semi-circular in cross-section to form the ball race proper and having two flanges of cylindrical shape extending backwardly from the groove, one at the outer side of the ball race and the other at the inner side formed from said blank and integral with the ball race.

4. As an article of manufacture, a ball race for the purpose described formed from a circular blank centrally perforated of sheet metal and provided with a circular groove semi-circular in cross-section to form the ball race proper and having two flanges of cylindrical shape extending rearwardly beyond the convex side of the ball race, one at the outer side of the ball race and the other at the inner side, one of said flanges being continuous with the metal at one side of the ball race.

5. As an article of manufacture, a ball race for the purpose described formed from a circular blank of sheet metal and provided with a circular groove semi-circular in cross-section to form the ball race proper and having two flanges of cylindrical shape, one at the outer side of the ball race and the other at the inner side formed from said blank and integral with the ball race, one of said flanges being continuous with the metal at one side of the ball race, and being bent inwardly at its edge to engage the other flange.

6. As an article of manufacture, a ball race for the purpose described formed from a circular blank of sheet metal centrally perforated and provided with a circular groove semi-circular in cross-section to form the ball race proper and having two flanges of cylindrical shape, one at the outer side of the ball race and the other at the inner side formed from said blank and integral with the ball race, one of said flanges being continuous with the metal at one side of the ball race, and one of said flanges being bent inwardly in a plane to form a circular wall engaging the convex surface opposite the ball race.

7. As an article of manufacture, a ball race for the purpose described formed from a circular blank centrally perforated of sheet metal and provided with a circular groove semi-circular in cross-section to form the ball race proper and having two flanges of cylindrical shape, one at the outer side of the ball race and the other at the inner side formed from said blank and integral with the ball race, one of said flanges being continuous with the metal at one side of the ball race, and extending around the opposite side of the ball race into contact with the other flange.

In testimony whereof I have hereunto affixed my signature.

FRED S. MORTON.